United States Patent Office 3,481,941
Patented Dec. 2, 1969

3,481,941
BASICALLY ETHERIFIED BISPHENOLS
Renat Herbert Mizzoni, Long Valley, N.J., assignor to Ciba Corporation, New York, N.Y., a corporation of Delaware
No Drawing. Filed Feb. 28, 1966, Ser. No. 530,371
Int. Cl. C07c 93/14; C07d 27/24; A01n 9/20
U.S. Cl. 260—294.7          5 Claims

ABSTRACT OF THE DISCLOSURE

Bis-(basically etherified hydroxyphenyl-monoaza-aliphatoxy)-benzenes, e.g. those of the formula $$Ph_1\!=\!(O\text{-}alk_1\text{-}\underset{\underset{R_1}{|}}{N}\text{-}alk_2\text{-}Ph_2\text{-}O\text{-}alk_3\text{-}Am)_2$$

$Ph_{1,2}$ = a phenylene radical
$R_1$ = H or alkyl
$Alk_{1-3}$ = alkylene or alkenylene
Am = an amino group N-oxides, quaternaries and salts thereof are antiparasitic agents.

---

The present invention concerns and has for its object the provision of bis-(basically etherified hydroxyphenyl-monoaza-aliphatoxy)-benzenes and methods for their preparation.

More particularly it relates to compounds of the Formula I

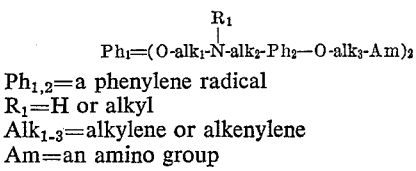

in which each of $Ph_1$, $Ph_2$ and $Ph_3$ stands for a phenylene radical, each of $Am_1$ and $Am_2$ for an amino group, each of $alk_1$ to $alk_6$ for lower alkylene or alkenylene, $alk_1$, $alk_2$, $alk_5$ and $alk_6$ of which separating the nitrogen atom from the oxygen atom by at least 2 carbon atoms, and each of $R_1$ and $R_2$ for hydrogen or lower alkyl, N-oxides and quaternaries thereof and salts of these compounds.

Of the phenylene radicals, $Ph_1$ preferably stands for a 1,3-phenylene radical, whereas $Ph_2$ and $Ph_3$ preferably stand for a 1,4-phenylene radical. They may be unsubstituted or substituted by one or more than one of the same or different substituents attached to any of the positions available for substitution. Such substituents are, for example, lower alkyl, such as methyl, ethyl, n- or i-propyl, n-, i-, sec. or tert.-butyl, etherified or esterified hydroxy or mercapto, for example, lower alkoxy or alkylmercapto, such as methoxy, ethoxy, n- or i-propoxy or n-butoxy, methyl or ethylmercapto, or halogen, such as fluoro, chloro or bromo, trifluoromethyl, nitro or amino, such as di-lower alkylamino, e.g. dimethylamino or diethylamino.

A lower alkylene radical $alk_1$ to $alk_6$ is, for example, methylene, 1,1- or 1,2-ethylene, 1,1-, 1,2-, 2,2- or 1,3-propylene, 1,1-, 1,2-, 2,2-, 1,3- or 1,4-butylene, 2-methyl-1,3-propylene, 2,3-, 2,4- or 1,5-pentylene, 1,4-hexylene or 2,6-heptylene. An alkenylene radical $alk_1$ to $alk_6$ is, for example, 1,3-prop-1-enylene, 2-methyl-1,3-prop-1-enylene, 1,3- or 1,4-but-1-enylene, 1,4-but-2-enylene or 2,4-pent-2-enylene, the double bond of which preferably extends from the carbon atom linked with the phenylene radical or oxygen atom respectively.

An alkyl radical $R_1$ and $R_2$ is for example, such mentioned as a Ph substituent. $R_1$ and $R_2$, however, stand preferably for a hydrogen atom.

An amino group $Am_1$ and $Am_2$ is preferably a tertiary amino group, such as di-lower alkylamino, lower alkylene-imino, monoaza-, -oxa- or thiaalkyleneimino, e.g. dimethylamino, methylethylamino, diethylamino, di-n- or i-propylamino or di-n-butylamino, ethyleneimino, pyrrolidino, piperidino, 1,4-pentyleneimino, 2,5-hexyleneimino or 2,6-heptyleneimino, piperazino, N-lower alkyl-piperazino, 3-aza-1,6-hexyleneimino, 3-lower alkyl-3-aza-1,6-hexyleneimino, 4-aza-1,7-heptyleneimino or 4-lower alkyl-4-aza-1,7-heptyleneimino, morpholino, 3,5-dimethyl-morpholino or thiamorpholino.

The compounds of the invention exhibit valuable pharmacological properties. Apart from hypotensive effects, they show primarily antiparasitic effects, for example, such against trypanosoma and helmiths, such as trypanasoma cruzi or tapeworms, e.g. hymenolepis nana, as can be demonstrated in animal tests using, for example, mice and dogs as test objects. They are, therefore, useful as antiparasitic agents in the treatment of Chagas' disease or tapeworm infestations, or as hypotensives. Furthermore, they can be used as intermediates in the preparation of other useful products, preferably of pharmacologically active compounds.

Particularly useful are compounds of the Formula II

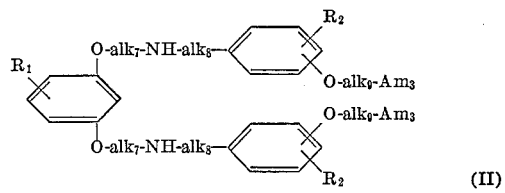

in which each of $R_1$ and $R_2$ stands for hydrogen, lower alkyl, lower alkoxy, lower alkylmercapto, halogen, trifluoromethyl, nitro or di-lower alkylamino, $Am_3$ for dialkylamino, in which alkyl contains up to 3 carbon atoms, pyrrolidino, piperidino, N-methyl or ethyl-piperazino, morpholino or thiamorpholino, each or $alk_7$ and $alk_9$ for alkylene with up to 3 carbon atoms separating the nitrogen atom from the oxygen atom by at least 2-carbon atoms, and $alk_8$ for alkylene with up to 3 carbon atoms or 1,3-prop-1-enylene being bound in 1-position with the phenylene radical, and acid addition salts thereof.

Compounds that are especially valuable are those of Formula III

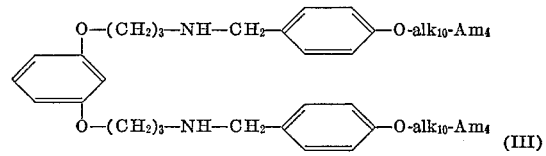

in which $alk_{10}$ stands for 1,2-ethylene, 1,2- or 1,3-propylene and $Am_4$ for dimethylamino, diethylamino, pyrrolidino or piperidino, and therapeutically acceptable acid addition salts, which, when given at a dose between 1 and 5 mg./kg. into a loop of the small intestine of dogs, show outstanding hypotensive activity, or given at a dose between 10 and 50 mg./kg. subcutaneously or intraperitoneally to mice show outstanding activity against trypanosoma cruzi.

The compounds of the invention are prepared according to methods in themselves known. For example, the process for the preparation consists in:

(a) Etherifying a bisphenol with a reactive ester of a (basically etherified hydroxyphenyl)-monoazaaliphatic alcohol or (b) Reacting a bis-(X-alkoxy or -alkenyloxy)-benzene with a basically etherified Y-alkyl or -alkenyl-phenol in which one of X and Y stands for a reactive esterified hydroxy group and the other for amino or monoalkyl-amino or, (c) Basically etherifying a bis-(hydroxyphenyl-mono-azaaliphatoxy)-benzene or, (d) Reacting an amine with a reactive ester of a bis-(hydroxy-alkoxy- or -alkenyloxyphenyl-monoazaaliphatoxy)-benzene or, (e) Reducing in a bis-(basically etherified hydroxyphenyl-monoazaaliphatoxy)-benzene, containing at least one carbamyl or methylideneimino group, said group to the methyleneamino group and, if desired converting any resulting compound into another compound of the invention.

A reactive ester of the alcohols used as starting material, is, for example, such derived from a hydrohalic acid, e.g. hydrochloric or hydrobromic acid, or a sulfonic acid, such as an alkane- or benzenesulfonic acid, e.g. methane-, ethane- or p-toluenesulfonic acid. Said reactive esters are advantageously reacted with the amines according to items (a), (b) and (d) in the presence of bases, preferably alkali metal carbonates or bicarbonates or tertiary nitrogen bases, such as trialkylamines, N,N-dialkylanilines or pyridines. The phenolic starting material mentioned under item (a) and (c) is preferably used in the form of its alkali metal salt and reacted with a reactive ester of the alcohol, e.g. those mentioned above.

The reduction according to item (e) is advantageously carried out with the use of complex light metal hydrides, such as alkali metal aluminum or borohydrides, e.g. lithium aluminum hydride or sodium borohydride, but also with the use of catalytically activated or nascent hydrogen, e.g. hydrogen in the presence of platinum or palladium catalysts or generated during electrolysis.

The compounds of the invention so obtained may be converted into each other by methods in themselves known. Thus, for example, a compound unsaturated in the aliphatic moiety may be hydrogenated with catalytically activated or nascent hydrogen. Primary, secondary or tertiary amines may be converted into tertiary amines or quaternaries respectively, for example, with the use of reactive esters of corresponding alcohols, preferably lower alkanols. The N-oxides of the invention are obtained, for example, by reacting the free bases with hydrogen peroxide or a peracid, e.g. peracetic, perbenzoic or monoperphthalic acid.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araaliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylene-sulfonic, halogenbenzenesulfonic, toluenesulfonic, naphthalenesulfonic and sulfanilic acid; methionine, tryptophan, lysine and arginine.

These or other salts of the new compounds, for example, the picrates, can be used also for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly, those starting materials should be used in the reactions of the invention that lead to the formation of those compounds indicated above as being specially valuable.

The starting material used is known, or if new, may be prepared according to known methods. Thus, for example, that mentioned under items (a) and (b) may be prepared from the corresponding alcohols, by esterification, such as reaction with halogenating or sulfonating agents, e.g. thionyl chloride, phosphorus pentabromide or p-toluenesulfonyl chloride, and the amines, for example, by reduction of corresponding oximes or nitriles. The compounds mentioned under items (c) and (d) may be prepared analogous to the reduction shown under (e) using the corresponding amides or Schiff's bases respectively. The compounds mentioned under item (e) can be prepared by reaction of the corresponding reactive acid derivatives, e.g. halides or anhydrides, or the aldehydes or ketones with the appropriate amines. Some starting material is also described in co-pending application Ser. No. 529,198 filed Feb. 23, 1966, now abandoned.

Starting materials or final products that are mixtures of isomers may be separated into single isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into the pure racemates, for example, by chromatography and/or fractional crystallization. Racemic products can likewise be resolved into the optical antipodes, for example, by reaction with optically active acids, separation of the diastereomeric salts and liberation of the bases from the salts.

The compounds of the invention can be used, for example, for the manufacture of pharmaceutical compositions containing them in conjunction or admixture with inorganic or organic, solid or liquid pharmaceutical excipients, suitable for enteral, parenteral or topical administration. Suitable excipients are substances that do not react with the compounds of the invention, for example, water, gelatine, sugars, e.g. lactose, glucose or sucrose starches e.g. corn starch or arrowroot stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, which are prepared by conventional methods, are also intended to be included within the scope of the present invention.

The following examples illustrate the invention, temperatures are given in centigrade, and all parts wherever given are parts by weight.

EXAMPLE 1

The solution containing 6.7 g. 1,3-bis-(3-amino-propoxy)-benzene and 12.4 g. 4-(2-dimethylamino-propoxy)- benzaldehyde in 50 ml. methanol is allowed to stand overnight at room temperature. Hereupon to the stirred mixture 3.6 g. sodium borohydride are added portionwise and after standing overnight it is evaporated in vacuo. The residue is taken up in water, the mixture extracted with diethyl ether, the extract dried, filtered and dry hydrogen chloride is bubbled through. The precipitate formed is filtered off and recrystallized from isopropanol-diethyl ether to yield the 1,3-bis-{5-[4-(2-dimethylamino-propoxy)-phenyl]-4-azapentoxy}-benzene tetrahydrochloride of the formula

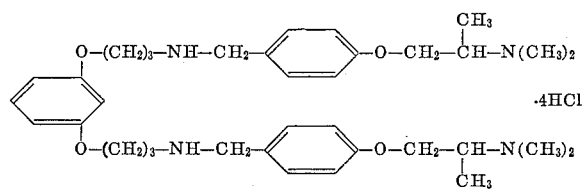

melting at 160–162°.

The starting material is prepared as follows: The mixture of 1,3-bis-(2-cyano-ethoxy)-benzene, 500 ml. anhydrous ethanol, 90 g. liquid ammonia and 10 g. Raney nickel is hydrogenated at 100° and 75 atm. After about 5 hours the hydrogen uptake is completed and the mixture filtered. The filtrate is evaporated in vacuo, the residue distilled and the fraction boiling at 148–150°/0.15 mm. Hg collected; it represents the 1,3-bis-(3-amino-propoxy)-benzene, its dihydrochloride melts over 250°.

2.3 g. sodium are reacted with 100 ml. anhydrous ethanol and to the solution 12.21 g. 4-hydroxy-benzaldehyde are added portionwise while stirring. After dissolution 13.7 g. 2-dimethylamino-propyl chloride in 30 ml. benzene are added during 15 minutes, the mixture is refluxed for 6 hours and allowed to stand overnight at room temperature. It is then filtered, the filtrate evaporated, the residue distilled and the fraction boiling at 161–163°/15 mm. Hg collected; it represents the 4-(2-dimethylamino-propoxy)-benzaldehyde.

EXAMPLE 2

The mixture of 11.2 g. 1,3-bis-(3-amino-propoxy)-benzene, 23.0 g. 4-(2-pyrrolidino-ethoxy)-acetophenone, 250 ml. toluene and 0.1 g. p-toluenesulfonic acid is refluxed for 20 hours on a water trap during which time the theoretical amount of water is separated. Hereupon it is evaporated in vacuo, the residue dissolved in 100 ml. methanol and to the stirred solution 6.0 g. sodium borohydride are added portionwise at room temperature. After standing overnight it is evaporated, to the residue 10 ml. water and 10 ml. 50% aqueous sodium hydroxide are added and the mixture is extracted twice with 100 ml. methylene chloride. The extract is dried, evaporated, the residue taken up in 300 ml. diethyl ether and the solution gassed with anhydrous hydrogen chloride. The solid formed is filtered off and recrystallized from ethanol-diethyl ether to yield the hygroscopic 1,3-bis{5-[4-(2-pyrrolidino-ethoxy)-phenyl]-4-azahexoxy} - benzene tetrahydrochloride of the formula

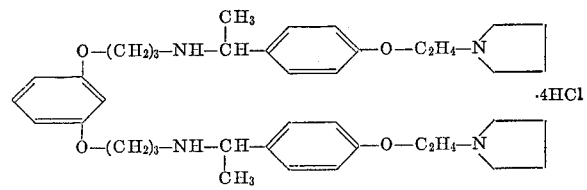

The starting material is prepared as follows: The solution of 27.2 g. 4-hydroxy-acetophenone in 150 ml. dry ethanol is added during 15 minutes to the solution prepared from 4.6 g. sodium and 200 ml. dry ethanol at room temperature while stirring. Hereupon the solution of 29.4 g. 2-pyrrolidino-ethyl chloride in 60 ml. benzene is added, the mixture refluxed for 3 hours, cooled, filtered and the residue washed with hot ethanol.

The filtrate is evaporated, the residue distilled and the fraction boiling at 199–200°/15 mm. Hg collected; it is redistilled and collected at 136–140°/0.15 mm. Hg and represents the desired 4-(2-pyrrolidino-ethoxy)-acetophenone.

EXAMPLE 3

Analogous to the method shown in Example 1, the following compounds are prepared from equivalent amounts of the corresponding starting material:

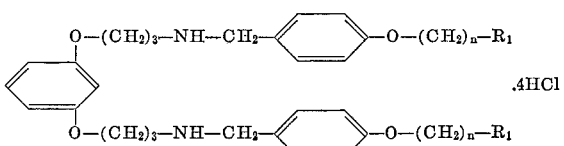

| n | $R_1$ | M.P. | Corresp. aldehyde, B.P. |
|---|---|---|---|
| 2 | Piperidino | 208–210° (dec.) | 218–220.5°/25 mm. |
| 2 | $N(CH_3)_2$ | 240–242° (dec.) | 121–124°/0.75 mm. |
| 3 | $N(C_2H_5)_2$ | 178–180° | 179–180°/22 mm. |

EXAMPLE 4

According to the method shown in Example 1 the following compounds are prepared from the equivalent amount of the corresponding starting material:

1,3-bis-{4-[3-(2-dimethylamino-propoxy)phenyl]-3-azabutoxy}-benzene,
1,3-bis{4-[3-(3-dimethylamino-propoxy)-phenyl]-3-azabutoxy}-benzene,
1,3-bis-{4-[3-methoxy-4-(2-dimethylamino-propoxy)-phenyl]-3-azabutoxy}-benzene,
1,2-bis-{4-[3-(2-pyrrolidino-ethoxy)-phenyl]-3-azabutoxy}-benzene,
1,4-bis-{3-[4-(2-dimethylamino-propoxy)-phenyl]-3-azabutoxy}-benzene,
1,3-bis-{6-[4-(2-morpholino-ethoxy)-phenyl]-3-azahex-5-enyloxy}-5-methoxy-benzene,
1,3-bis-{6-[3-(2-thiamorpholino-propoxy)-5-chloro-phenyl]-3-azahex-5-enyloxy}-benzene,
1,4-bis-{5-[4-(4-dimethylamino-butoxy-phenyl]-4-azapent-1-enyloxy}-benzene and
1,3-bis-{5-[3-(2-N-methylpiperazino-ethoxy)-5-methyl-phenyl]-4-azahex-1-enyloxy}-5-chloro-benzene
and the tetrahydrochlorides thereof.

What is claimed is:
1. A symmetrical bis-(basically etherified hydroxy-phenyl-monoazaaliphatoxy)-benzene having the formula

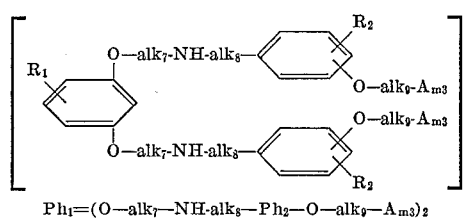

$Ph_1=(O—alk_7—NH-alk_8—Ph_2—O—alk_9—Am_3)_2$ in which $Ph_1$ is 1,3-phenylene and $PH_2$ is 1,4-phenylene, both $Ph_1$ and $Ph_2$ being unsubstituted, $Am_3$ is a member selected from the group consisting of dialkylamino, in which alkyl contains up to 3 carbon atoms, pyrrolidino, piperidino, each of $alk_7$ and $alk_9$ is alkylene with up to 3 carbon atoms separating the nitrogen atom from the oxygen atom by at least 2-carbon atoms, and $alk_8$ is alkylene with up to 3 carbon atoms and a therapeutically acceptable acid addition salt thereof.

2. A compound as claimed in claim 1 and having the formula

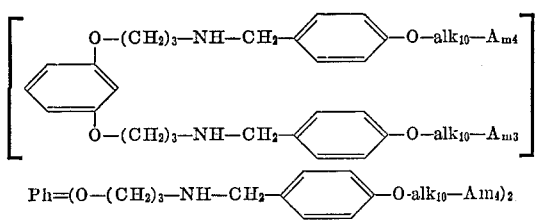

$Ph=(O-(CH_2)_3-NH-CH_2-\langle\phantom{xx}\rangle-O\text{-alk}_{10}-Am_4)_2$ in which Ph is 1,3-phenylene, $alk_{10}$ stands for a member selected from the group consisting of 1,2-ethylene, 1,2-propylene and 1,3-propylene and $Am_4$ for a member selected from the group consisting of dimethylamino, diethylamino, pyrrolidino and piperidino and a therapeutically acceptable acid addition salt thereof.

3. A compound as claimed in claim 2 and being the 1,3-bis-[5-(4-R-phenyl)-4-azapentoxy]-benzene in which R stands for a member selected from the group consisting of 2-piperidino-ethoxy, 2-dimethylamino-ethoxy and 3-diethylamino-propoxy.

4. A compound as claimed in claim 2 and being the 1,3 - bis-{5-[4-(2-dimethylamino - propoxy)-phenyl] - 4-azapentoxy}-benzene.

5. A compound as claimed in claim 2 and being the 1,3-bis-{5-[4-(2-pyrrolidino - ethoxy)-phenyl]-4-azahexoxy}-benzene.

References Cited

UNITED STATES PATENTS 3,250,767   5/1966   Bencze.

HENRY R. JONES, Primary Examiner

R. T. BOND, Assistant Examiner

U.S. Cl. X.R.

260—239, 243, 246, 268, 293.4, 294.7, 326.5, 570.7; 424—244, 246, 248, 250, 267, 274, 330

CASE SU-469

PO-1050
(5/69)

UNITED STATES PATENT OFFICE
CERTIFICATE OF CORRECTION

Patent No. 3,481,941      Dated December 2, 1969

Inventor(s) RENAT HERBERT MIZZONI

It is certified that error appears in the above-identified patent and that said Letters Patent are hereby corrected as shown below:

Column 6, line 60, delete the bracketed formula.

Column 7, line 5, delete the bracketed formula.

SIGNED AND
SEALED
NOV 17 1970

(SEAL)
Attest:

Edward M. Fletcher, Jr.
Attesting Officer

WILLIAM E. SCHUYLER, JR.
Commissioner of Patents